Patented June 30, 1953

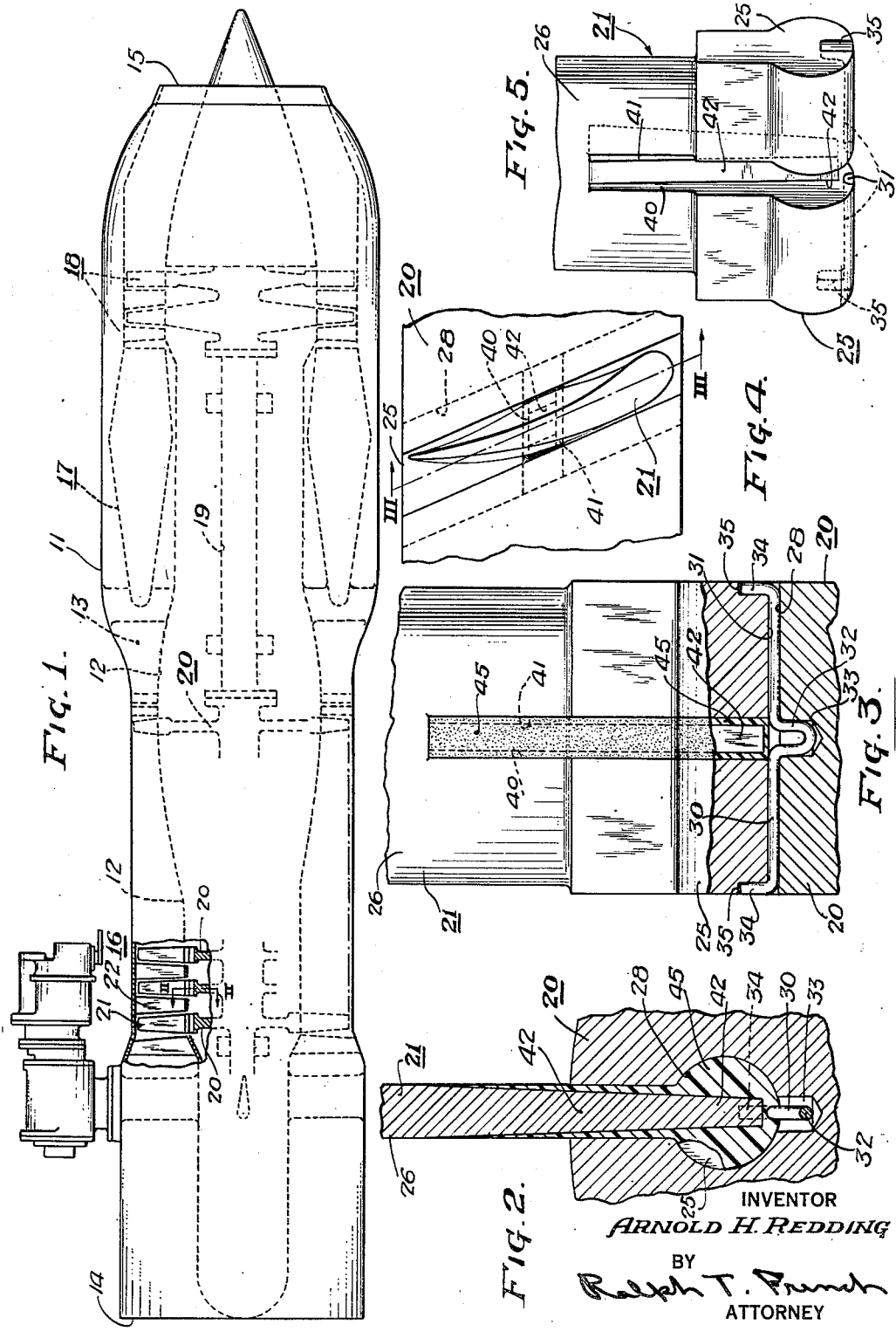

2,643,853

UNITED STATES PATENT OFFICE 2,643,853

TURBINE APPARATUS

Arnold H. Redding, Swarthmore, Pa., assignor to Westinghouse Electric Corporation, East Pittsburgh, Pa., a corporation of Pennsylvania Application July 26, 1948, Serial No. 40,731

5 Claims. (Cl. 253—77)

This invention relates to blading for elastic fluid machines such as rotary compressors and turbines, and more particularly to a blade structure for an axial flow compressor.

It has been proposed to provide an axial flow compressor for a gas turbine engine in which blades having root portions are mechanically fastened into a rotary structure, the fastening being characterized by features of construction contributing the lightness and strength desirable in aircraft equipment. For certain classes of service, however, one shortcoming may be the relatively small amount of damping present. During high speed operation of such a bladed rotor, the absence of means to effect damping may sometimes permit amplification of relatively small exciting forces into dangerously large vibrations of the blades.

It is a principal object of the present invention to provide means for introducing a larger degree of damping into a blade of this type.

Another object of the invention is the provision of an improved blade structure including a root portion having relatively large damping characteristics, and adapted for use in an axial flow compressor of current design without necessitating substantial alterations.

A well known and approved method of fastening blading into the rotor of a compressor comprises the provision of a central recess in each of the transverse blading grooves of the rotor, the insertion therein of a pin or key having overlapping ends and a suitable loop or bend engageable in the recess, and the forming of a complementary keyway in the bottom of the associated blade root for receiving the key when the blade is driven into place, the overlapping ends of the key being finally bent into engagement with the flat end faces of the root. It is a further object of the invention to provide such a blade with means for damping vibrations without requirement of changes in design or interference with the fastening means described.

Still another object of the invention is the provision of an improved blade having a root portion carrying an energy absorbing medium, such as plastic, adapted to effect damping of vibrations of the blade during operation.

These and other objects are effected by the invention as will be apparent from the following description and claims taken in connection with the accompanying drawings, forming a part of this application, in which:

Fig. 1 is a diagrammatic elevational view of an aviation gas turbine engine having a compressor adapted to be equipped with blading constructed in accordance with the invention;

Fig. 2 is a fragmentary sectional view, in enlarged detail, of a blade of the compressor taken on line II—II of Fig. 1;

Fig. 3 is a side view, partly in section, of the blade shown in Fig. 2;

Fig. 4 is a plan view of the blade shown in Fig. 3; and

Fig. 5 is a fragmentary perspective view, in somewhat reduced detail, of a blade constructed in accordance with the invention but before the application thereto of the plastic.

An aviation gas turbine engine chosen for illustration of a practical application of the improved blade is shown in Fig. 1 as comprising a cylindrical outer casing structure 11 containing a coaxial inner casing structure 12 defining an annular passageway 13 which extends throughout the power plant from an air intake opening 14 to a rearwardly disposed discharge nozzle 15. Operating components of the power plant comprise an axial flow compressor 16, fuel combustion apparatus 17 and a turbine 18, which is operatively connected to the rotor 20 of the compressor through the medium of a shaft 19 that is journaled within the inner casing structure 12. The rotor 20 of the compressor 16 comprises a plurality of radially disposed blades such as the blade 21, which blades are arranged for cooperation with a plurality of inner stationary blades such as 22 for compressing air in the well-known manner. In operation, air entering the intake opening 14 of the power plant is compressed by the compressor 16 and delivered to the combustion apparatus 17, from which heated motive fluid is expanded through the turbine 18 and discharged by way of the nozzle 15, usually in the form of a jet establishing a propulsive thrust.

Referring to Figs. 2 and 3, the blade 21 comprises a root portion 25 and a body portion 26, the root portion 25 being enlarged and preferably rounded in form, as best shown in Fig. 2. The rotor 20 has formed therein a suitable groove 28 for receiving the root portion 25 of the blade, the groove 28 being in usual practice inclined at an angle with respect to the axis of the rotor, as may best be seen in Fig. 4 of the drawing. For securing the blade 21 in place, a pin or key 30 is provided, which as shown in Fig. 3 is adapted to extend through a groove 31 formed in the bottom of the root portion 25 of the blade. The key 30 is provided intermediate its ends with a bend or loop 32, which is adapted for engagement in a recess 33 formed in the rotor 20. In mounting the blade 21 in place on the rotor 20, the key 30 is first inserted into the groove 28, with the loop 32 engaging in the recess 33. The root portion 25 of the blade is then introduced into the groove 28, and the overlapping ends 34 of the key are then bent into engagement with suitable lateral grooves 35 formed in the root portion, thereby locking the blade in place.

According to the invention, means is provided for introducing into the blade structure a plastic medium having a high energy absorbing characteristic. In the present embodiment of the invention, as illustrated in Fig. 5, this result is accomplished by milling a pair of substantially parallel grooves 40 and 41 in the root portion 25 and adjacent the portion of the body 26 of the blade, thereby forming a tongue portion 42, sufficient material being removed from the sides of the tongue to reduce the thickness thereof, as best shown in Fig. 2. The lower end of the tongue 42 may terminate inwardly of the bottom portion of the root 25 containing the groove 31, in order to provide clearance for the key 30. For absorbing vibrations of the tongue 42 the grooves 40 and 41 and adjacent spaces on opposite sides of the tongue are filled with a suitable material or plastic 45 having a high energy absorbing characteristic. Any acceptable plastic may be employed for this purpose, within the scope of the invention, such as one of the melamine resins with a suitable filler for facilitating molding to shape and resisting heat distortion.

With such a plastic having a high damping characteristic thus substituted for the metal removed from the root portion of the blade, and with the blade 21 mounted in place on the rotor 20 as shown in Fig. 2, any tendency of the blade to vibrate or bend during operation will result in simultaneous pressure of the relatively free tongue portion 42 against the mass of plastic 45. For example, if the body portion 26 of the blade 21 tends to move to the left, as viewed in Fig. 2, the lower end of the tongue 42 will at the same time tend to move toward the right, such movement thereof being restrained only by the plastic 45. The tongue portion 42 in so moving does work on the plastic 45, which thus absorbs energy from the vibration, i. e. the vibration is damped. The plasticity of the material 45 is thus utilized for absorbing sufficient energy transmitted by way of the tongue portion 42 of the blade to prevent such vibrations from increasing to an excessive amplitude.

From the foregoing, it will now be seen that a blade of either existing or advanced design may readily be afforded the described features of construction to render it resistant to the development of undesired periodic vibrations by provision of a suitable surface or recesses in the root portion defining a tongue which is adapted to respond to incipient forces by doing work in a mass of energy absorbing material, such as a plastic contained in the recesses of the blade root, so that undesired vibratory forces will be effectively damped rather than permitted to become amplified to a dangerous degree.

While the invention has been shown in but one form, it will be obvious to those skilled in the art that it is not so limited, but is susceptible of various changes and modifications without departing from the spirit thereof.

What is claimed is:

1. A blade for the rotor of a fluid pressure machine comprising a body having a root portion, said root portion having a pair of parallel slots disposed parallel to the blade axis radially of the rotor and forming a relatively narrow inner tongue portion flanked by lateral portions having surfaces of greater area in planes parallel to said slots, the sides of said tongue portion being disposed inwardly of the outer surfaces of said root portion, and vibration absorbent solid plastic material filling said slots and enveloping said tongue portion between said lateral portions.

2. In a bladed elastic fluid machine, a rotor having spaced transverse grooves for receiving blade root portions, each of said grooves comprising a channel opening into an inner concavity, blade structures having root portions mounted in snug fitting relation in said grooves, each of said blade root portions having a bulbous end portion complementary to the corresponding groove concavity, said end portion being cut away to provide a relatively narrow integral tongue portion of less thickness than said root portion and spaced between lateral walls thereof, and solid plastic material filling such cut away spaces and enveloping said tongue portion, portions of said plastic material being interposed between the tongue portion of each blade structure and the corresponding groove for damping any vibrations produced in said blade.

3. A blade structure for a rotor having a blade-receiving groove, comprising a radially-disposable body having a root portion engageable in said groove, said root portion being bifurcated by a slot formed therein parallel to the blade axis radially of the rotor, a narrow tongue portion disposed along the blade axis within said slot and having an outer end integral with said blade body, the inner end of said tongue portion being spaced from adjacent surfaces of the root portion and disposed in said slot within said root portion of the blade, all lateral surfaces of said tongue portion being spaced inwardly of the outer surfaces of said blade, and a solid plastic material enveloping said tongue portion and filling said slot for interposing a relatively yieldable mass between all lateral surfaces of said tongue portion and said receiving groove, said tongue portion being operable upon bending of the blade body to do work on said plastic for damping blade vibrations.

4. In a bladed elastic fluid machine, a rotor having a transverse groove for receiving a blade root portion, a blade structure including an enlarged root portion having an elongated recess extending parallel to the radial axis of the blade, relative to the rotor, and adapted to be mounted in snug fitting relation in said groove, a mass of plastic material disposed in said recess of said blade root portion, a relatively narrow tongue formed integral with said blade structure and extending, with respect to said rotor, radially inwardly into said recess from a portion of the blade disposed outwardly of the rotor, said tongue being of less thickness than said root portion with all tongue surfaces disposed inwardly thereof, said tongue being embedded in said mass of plastic material to dissipate vibratory energy for damping high frequency oscillations tending to develop in the blade.

5. Blade structure as set forth in claim 4, characterized by provision of separate means for securing the blade root against displacement from the receiving groove of the rotor.

ARNOLD H. REDDING.

References Cited in the file of this patent

UNITED STATES PATENTS

| Number | Name | Date |
|---|---|---|
| 1,434,414 | Stoney | Nov. 7, 1922 |
| 1,619,133 | Kasley | Mar. 1, 1927 |
| 1,833,751 | Kimball | Nov. 24, 1931 |
| 2,310,412 | Flanders | Feb. 9, 1943 |
| 2,317,338 | Rydmark | Apr. 20, 1943 |
| 2,434,935 | Kroon | Jan. 27, 1948 |